May 13, 1969     J. R. EWING     3,443,937

IMAGE RESOLUTION

Filed April 20, 1965

INVENTOR.
JOAN R. EWING
ATTORNEYS 3,443,937
IMAGE RESOLUTION
Joan R. Ewing, Rochester, N.Y., assignor to Xerox Corporation, Rochester, N.Y., a corporation of New York
Filed Apr. 20, 1965, Ser. No. 449,467
Int. Cl. G03g 13/12
U.S. Cl. 96—1.1                                              14 Claims

ABSTRACT OF THE DISCLOSURE

An imaging plate for use in xerographic deformation imaging comprising an electrically conductive support substrate, a layer of vitreous selenium in intimate contact with said substrate, overlying and in intimate contact with said layer of vitreous selenium, an interlayer comprising an electron donor material and an electrically insulating resin, and, overlying and in intimate contact with said interlayer, a layer comprising a deformable resin.

---

Figure 1:
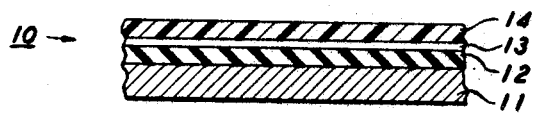

This invention relates to deformation imaging by means of xerography and, more particularly, to enhanced resolution of deformation images.

The application of xerography to the formation of deformation images in a softenable material is now well-known. One successful method of deformation imaging, more fully set forth in U.S. patent application Ser. No. 193,277, comprises a first step of uniformly electrostatically charging a three-layer imaging plate structure comprising a deformable plastic layer and a photoconductive layer overlying a conductive support member. Exposure of the uniformly charged structure to an optical image of a master to be reproduced selectively dissipates the electrostatic charge and results in the formation of a latent electrostatic image. A second uniform electrostatic charge is then applied to the structure and the deformable layer softened, for example, by the application of heat or exposure to solvent vapors, to enable it to deform in response to the forces exerted by the applied electrostatic charges. A deformation image faithfully conforming to the master is thereby produced in the deformable layer. Ordinarily, the deformation image is then fixed by causing or permitting the deformable layer to harden.

Deformation imaging processes employing the use of a photoconductive layer have also been disclosed in printed publications. Particular reference is made to "A Cyclic Xerographic Method Based on Frost Deformation" by R. W. Gundlach and C. J. Claus, Journal of Photographic Science and Engineering January–February edition, 1963.

An essential part of the imaging plate employed in the above-described process is a photoconductive layer. That is, informing the electrostatic image, a layer is used which is sufficiently electrically insulating to retain an electrical charge in darkness, but becomes relatively more conductive when exposed to actinic radiation. In xerographic deformation imaging, as well as in xerographic imaging generally, plates incorporating photoconductive layers of vitreous selenium have proved highly satisfactory. Desirable xerographic properties of vitreous selenium include, among others; durability, adequate spectral response, and optical sensitivity. Owing to its ability to quickly and substantially fully discharge in response to ordinary light, vitreous selenium is also highly suitable for repetitive processes in which the imaging structure may be rapidly recycled.

However, it has been found that many highly suitable deformable imaging materials adversely affect the resolution capabilities of vitreous selenium when they are incorporated in the imaging structure, apparently because they promote the lateral conductivity of the selenium layer when placed in contact with it. The resolution capabilities of imaging plate structures incorporating a vitreous selenium photoconductive layer have, in fact, been somewhat disappointing in view of the known capabilities of selenium xerographic plates for producing high quality powder images. Nevertheless, owing to the aforementioned desirable properties, vitreous selenium remains a highly preferred material for use in xerographic deformation imaging (as well as in xerography in general) especially if its image resolution capabilities are enhanced.

Improved xerographic deformation imaging is, therefore, an object of this invention. Improved image resolution of deformation images formed in imaging plate structures incorporating a photoconductive layer of vitreous selenium is also an object of this invention. Other objects of this invention include, among others: an improved plate structure for xerographic deformation imaging; prevention of lateral conductivity in vitreous selenium layers in contact with deformable plastics; enhanced resolution capabilities of selenium plates for use in deformation imaging; and, methods and structure capable of producing high resolution deformation images.

Briefly summarized, it has been found that the above-stated objects can be achieved by incorporating certain resolution enhancing agents in the xerographic plate structure used in the deformation imaging process. In the preferred embodiment of this invention, the desired effect is produced by incorporating between the photoconductive layer and the deformable layer, an additional layer of plastic impregnated with a resolution enhancing agent. Electron donor materials are useful for this purpose, and especially good results are achieved by using nigrosine as the resolution enhancing agent. Other suitable materials are specifically disclosed in the detailed description of the present invention. According to the present invention, a highly suitable imaging structure is made up of four layers: a conductive support base, a photoconductive layer of vitreous selenium, an interlayer of nigrosine impregnated plastic, and uppermost in the structure, a deformable plastic imaging layer.

Figure 2:

In the following detailed description of the present invention reference is made to the accompanying drawing in which:

FIG. 1 schematically represents a preferred embodiment of an imaging structure including a separate resolution enhancing layer; and, FIG. 2 schematically represents an alternate structure in which the resolution enhancing material is incorporated in the deformable layer itself.

Reference is made to FIG. 1 which shows the preferred plate structure for xerographic deformation imaging in accordance with the present invention. Plate 10 comprises an electrically conductive support layer 11 and a photoconductive layer 12 of vitreous selenium in intimate contact therewith; interlayer 13, of plastic impregnated with a resolution enhancing material such as nigrosine, is included between photoconductive layer 12 and deformable layer 14.

Specific details for making plates of the kind illustrated in FIG. 1 will be more fully set forth in the specific examples included herein. It may be generally stated, however, that an imaging plate 10 may be readily made by applying the materials constituting interlayer 13 to a commercially available selenium xerographic plate by means of conventional coating techniques, and, after the interlayer has been allowed to dry sufficiently, again using conventional coating techniques to form the deformable layer of the plate structure. Alternatively, imaging structures may be prepared by forming a layer of vitreous selenium on a metallic substrate by means of the process disclosed in U.S. Patent No. 2,970,906 to Bixby. The resolution enhancing layer and deformable imaging layer may then be formed on the selenium coated substrate.

It is noted that the preferred plate structure includes a separate resolution enhancing layer in direct contact with the photoconductive layer of vitreous selenium. It has been found that this embodiment yields the greatest improvement in imaging resolution without deleteriously affecting image density.

As well-known in xerography, layer 11 comprises a conductive material capable of supporting a layer of vitreous selenium. Although aluminum and brass members are commonly used for this purpose, other metals are also suitable as are materials such as glass or plastics having a conductive coating.

Interlayer 13 preferably comprises a solid solution of an electron donor substance in an insulating resin binder. Especially suitable electron donor substances include secondary aromatic amines, such as, for example, nigrosine, Methylene blue, Indigo blue, and N,N'-diphenyl-p-phenylene diamine. Most Lewis bases, including tri-n-butyl amine, ferrous chloride, stannous chloride, and the like, are also suitable electron donor substances usable in the present invention.

Generally, it is best to use a resin with a resistivity of at least $10^{14}$ ohm-centimeters as the binder material for interlayer 13. Suitable resins include: vinyl chloride acetate copoylmers (such as that marketed under the tradename Vinylite VYNS by Union Carbide Plastics Co.) cellulose acetate butyrate; polymethacrylate resins; polycarbonate resins; styrene acrylonitriles; and, polyurethane resins. Other suitable resins known in the art of xerography conforming to the aforementioned conductivity requirements may also be used.

Electrostatically deformable materials suitable for use in layer 14 are well-known in the art. These include, for example: glyceryl esters of hydrogenated rosin, such as Staybelite Ester 10 (Hercules Powder Co.); thermoplastic polymers such as polystyrene; copolymers made from styrene and other materials such as vinyl toluene, methyl styrene, and polymers and copolymers made from petroleum cuts and indene polymers; phenyl-aldehyde resins; vinyl polymers; acrylic esters; polyethylene polymers, such as Piccopale (Pennsylvania Industrial Chemical Corporation).

FIG. 2 illustrates an alternate imaging plate structure for use in accordance with the present invevntion. As shown, plate 20 comprises a specially treated deformable layer 21 in intimate contact with photoconductive layer 22 overlying conductive support layer 23. In this embodiment, as in the embodiment described above, photoconductive layer 22 comprises vitreous selenium; conductive support layer 23 comprises any suitable material known in the art in xerography, such as those mentioned as suitable for use in layer 11 of FIG. 1.

Essentially, the embodiment of FIG. 2 differs from that of FIG. 1 in the incorporation of the resolution enhancing material in the deformable layer itself, rather than in an interlayer separating the deformable layer from the photoconductive layer. Electron donor substances are generally useful in connection with the embodiment of FIG. 2, including, for example, all of the above-mentioned resolution enhancing materials. Plate 20 may be conveniently made, for example, by dip coating a selenium xerographic plate with a solvent solution of a deformable resin in which approximately 0.1% by weight with respect to the resin of an electron donor material has been dispersed or dissolved.

The following specific examples are presented to more fully explain the preparation and use of the illustrated imaging plate structures and to demonstrate the resolution enhancing capabilities of the present invention. Accordingly, the examples are not intended to limit the present invention, but to enable those skilled in the art to more fully understand and readily practice the present invention.

Series I

Standard xerographic plates having a 50μ layer of selenium overlying an aluminum substrate were used to make a series of imaging plates of the type shown in FIG. 1.

Coating solutions used for forming interlayer 13 comprised Vinylite VYNS dissolved in diethyl ketone to which varying amounts of solutions of nigrosine in diethyl ketone were added to yield coating solutions having the following nigrosine concentration, by weight, with respect to the copolymer: 0.1%, 1.0%, 5.0% and 10.0%.

The selenium plates were immersed in the solutions and withdrawn at vertical speeds of from 2 to 10 in./min. to yield plates with the following coating thicknesses: 0.1, 0.5, 1.0 and 2.5 microns.

After the above coatings were dried at room temperature, a one micron deformable layer 14 was formed by dip coating the plates in a solution of Staybelite Ester 10, a glyceryl ester of hydrogenated rosin of Hercules Powder Co., in Super Naphtholite, an aliphatic hydrocarbon of American Mineral Spirits Co. The plates were then oven dried at 120° F. for one-half hour.

Deformation images were then made in accordance with known xerographic deformation imaging techniques as follows: The plates were uniformly electrostatically charged and then optically exposed by contact to a Buckbee Meers USAF resolution chart for about 4 seconds. After exposure, the plates were recharged, exposed to room light, and heated on a hot plate at 140° F. for one-half to three minutes. When the deformation image was fully formed, the plate was removed from the hot plate and plunged into cold water. Resolution of the deformation images was then determined by microscopic deformation. The results are given in Table I.

TABLE I

| Interlayer thickness (μ) | Nigrosine concentration (percent) | Resolution (l./mm.) |
| --- | --- | --- |
| 0.1 | 0.1 | 58 |
| 1.0 | 0.1 | 58 |
| 0.1 | 1.0 | 115 |
| 0.5 | 1.0 | 56 |
| 1.0 | 1.0 | 56 |
| 2.5 | 1.0 | 65 |
| 0.1 | 5.0 | 115 |
| 0.1 | 10.0 | 65 |
| 1.0 | 10.0 | 58 |

For comparison purposes, a control series of imaging plates was prepared as above, but without the incorporation of nigrosine in interlayer 13.

The resolution developed was only 4 l./mm. Thus, the results shown in Table I demonstrate the marked resolution enhancing capabilities of the present invention. Moreover, it was observed that incorporation of the resolution enhancing material does not materially affect the density of the images produced.

Additional tests were performed with plates prepared as above-described for Series I and the control series, but with thicker deformation layers. Again, plates incorporating the nigrosine impregnated interlayers proved to have much higher image resolution capabilities.

Series II

Standard xerographic plates were again used to make a series of imaging plates of the type shown in FIG. 1 for the purpose of demonstrating the effect of another image enhancing material. Interlayer 13 of plates in this series comprised N,N'-diphenyl-p-phenylene diamine in a binder layer of Vinylite VYNS. The results achieved with the above-described imaging process are given in Table II. (Concentration of the resolution enhancing material is again expressed in percent by weight, with respect to the binder.)

TABLE II

| Interlayer Thickness (μ) | N,N'-diphenyl-p-phenylene diamine concentration (percent) | Resolution (l./mm.) |
| --- | --- | --- |
| 0.5 | 5 | 60 |
| 0.5 | 10 | 60 |
| 5.0 | 5 | 30 |
| 5.0 | 10 | 40 |

Again, the resolution capabilities far exceeded that of similarly imaged deformation layers on plates with interlayers of Vinylite VYNS, but without a resolution enhancing agent therein.

Series III

A third series of plates of the type shown in FIG. 1 in which interlayer 13 comprised Vinylite VYNS and stannous chloride. The plates were used in the above-described deformation imaging process, and, again, a significant increase in image resolution was noted as compared with similar plates made without a resolution enhancing agent.

To more fully illustrate an alternate embodiment of the present invention, the following specific example of the use of an imaging plate of the type shown in FIG. 2 is presented. Again, standard xerographic plates of selenium overlying aluminum backings were used. In this mode, the xerographic plate is dip coated to form a deformable layer 21 of Staybelite Ester 10 impregnated with 0.1% by weight of nigrosine over the selenium layer. After the coating dries, the plate is ready for use in the above-described deformation imaging process. Images characterized by resolutions of about 15 l./mm. were observed which, again, compares favorably with images produced on untreated deformable layers.

What is claimed is:

1. An imaging plate for use in xerographic deformation imaging comprising:
    an electrically conductive support substrate;
    a layer of vitreous selenium in intimate contact with said substrate;
    overlying and in intimate contact with said layer of vitreous selenium, an interlayer comprising an electron donor material and an electrically insulating resin; and,
    overlying and in intimate contact with said interlayer, a layer comprising a deformable resin.

2. An imaging plate according to claim 1 in which said electron donor material comprises a material selected from the group consisting of: nigrosine, stannous chloride, ferrous chloride, Indigo blue, Methylene blue, N,N'-diphenyl-p-phenylene diamine, and tri-n-butyl amine.

3. An imaging plate according to claim 1 in which said electron donor material comprises nigrosine.

4. An imaging plate for use in xerographic deformation imaging, comprising:
    a photoconductive layer of vitreous selenium overlying a conductive substrate;
    an interlayer comprising an electron donor material and a vinyl chloride acetate copolymer overlying said photoconductive layer; and,
    an electrostatically deformable layer overlying said interlayer.

5. An imaging plate as claimed in claim 4 wherein the electron donor material comprises nigrosine.

6. An imaging plate as claimed in claim 4 wherein the electron donor material comprises N,N'-diphenyl-p-phenylene diamine.

7. An imaging plate as claimed in claim 4 wherein the electron donor material comprises stannous chloride.

8. An imaging plate as claimed in claim 4 wherein the electron donor material comprises nigrosine and the electrostatically deformable layer comprises a glyceryl ester of hydrogenated rosin.

9. An imaging member as claimed in claim 8 in which the concentration of said nigrosine is in the range of about 0.1% to 10% by weight of the interlayer.

10. An imaging member as claimed in claim 8 in which the thickness of the interlayer is in range of about 0.1 to 5.0 microns.

11. An imaging member as claimed in claim 8 in which the interlayer is approximately 0.1 micron in thickness and comprises approximately 1.0% nigrosine by weight.

12. An imaging plate for use in xerographic deformation imaging comprising:
    a first layer of vitreous selenium overlying a conductive substrate; and,
    overlying said first layer a second layer comprising an electrostatically deformable material and an electron donor material.

13. An imaging plate as claimed in claim 12 in which said second layer comprises 0.1% nigrosine and 99.9% glyceryl ester of hydrogenated rosin.

14. A method of xerographic deformation imaging which comprises:
    (a) providing a xerographic plate having a layer of vitreous selenium overlaying a conductive substrate, an interlayer overlaying said selenium layer comprising an electron donor material and an electrically insulating resin, and a layer of electrostatically deformable material overlaying said electron donor interlayer;
    (b) applying a substantially uniform electrostatic charge to surface of said plate;
    (c) exposing said plate to an optical image;
    (d) applying a second substantially uniform electrostatic charge to said plate; and
    (e) softening said deformable material whereby a deformation image conforming to said optical image is formed.

References Cited

UNITED STATES PATENTS

| 2,987,395 | 6/1961 | Jarvis | 96—1.7 |
| 3,052,540 | 9/1962 | Greig | 96—1.7 |
| 3,055,006 | 9/1962 | Dreyfoos et al. | 346—74 |
| 3,113,022 | 12/1963 | Cassiers et al. | 96—1.5 |
| 3,196,011 | 7/1965 | Gunther et al. | 96—1.1 |

J. TRAVIS BROWN, *Primary Examiner.*

C. E. VAN HORN, *Assistant Examiner.*

U.S. Cl. X.R.

96—1.5